United States Patent

[11] 3,588,370

[72] Inventors Wolf Nottnagel;
Oskar Schrenk, Munich, Germany
[21] Appl. No. 682,884
[22] Filed Nov. 14, 1967
[45] Patented June 28, 1971
[73] Assignee Siemens Aktiengesellschaft
Berlin, Germany
[32] Priority Nov. 24, 1966
[33] Germany
[31] S 107094

[54] SWITCHING CIRCUIT TO CONTROL CALL NUMBER TRANSMITTERS IN AUTOMATIC TELEPHONE SYSTEMS
6 Claims, 2 Drawing Figs.

[52] U.S. Cl. 179/27, 179/18
[51] Int. Cl. H04m 3/00
[50] Field of Search 179/27.02, 18 (AD), 90 (B)

[56] References Cited
UNITED STATES PATENTS
2,861,131 11/1958 Villmann 179/90
3,211,838 10/1965 Ericsson 179/27

*Primary Examiner*—Kathleen H. Claffy
*Assistant Examiner*—Douglas W. Olms
*Attorney*—Birch, Swindler, McKie and Beckett

ABSTRACT: A switching circuit for use in conjunction with telephone systems wherein call number transmitters are employed to automatically establish connections between selected subscribers. A signal receiver is responsive to the receipt of signals, rather than the repetition rate thereof, to provide control criteria in conjunction with the switching state of the call number transmitter, to control the latter. The call number transmitter is thereby controlled to interrupt transmission of the call number upon receipt of a busy tone by the signal receiver, in order that the central control systems associated with the telephone exchange and the trunk are not seized for an unnecessary period of time and are therefore free for seizure by other subscribers. The transmission of the first digit of the call number is dependent upon receipt of an appropriate signal by the signal receiver, rather than upon the elapsing of a predetermined time period associated with switching the first dial stage of the associated exchange to a condition wherein it is ready to receive the first digit.

SWITCHING CIRCUIT TO CONTROL CALL NUMBER TRANSMITTERS IN AUTOMATIC TELEPHONE SYSTEMS

CROSS REFERENCE TO RELATED APPLICATION

Applicants claim priority from corresponding German Pat. application Ser. No. S107,094, filed Nov. 24, 1966, in Germany.

BACKGROUND OF THE INVENTION

1. Field of the Invention

The invention relates to a switching system for long distance communications and has particular utility in telephone installations. A call number transmitter and a signal receiver are associated with a subscriber installation having extension stations to automatically establish connections between the subscriber installation and a public telephone exchange, and to supervise the operating state of the connection system.

2. Description of the Prior Art

Prior art long distance communication systems provide for the supervision of the operating state of the connection system associated with connection lines of a telephone installation. Signal receivers are connected to the connection lines and are switched into operation during establishment of the connection between the calling and called subscriber stations, during the time interval prior to transmission of the first current pulse series representative of the first digit of the call number by the calling station, and/or within the time interval between successive current pulse series representative of successive digits of the call number. Therefore receipt of audible tone signals that may be indicative of dial tones, ring back tones, or busy tones by the signal receiver, representative of the state of the connection system during the time that the desired connection is being established, is possible. By evaluating the received tones and, more particularly, the repetition rate thereof, corresponding switching criteria may be derived to control the call number transmitter.

The call number transmitter may be adapted to operate as a call repeater so that upon the receipt of a busy tone by the signal receiver, the call is repeated until the signal receiver receives a ring back tone indicating that the called subscriber is free. The call may then be completed.

Modern telephone systems, however, operate at high switching speeds through the use of electronic switching systems. Therefore, the call number transmitter is subjected to demands corresponding to the relatively high switching speeds, and the prior art circuits described above cannot satisfy such demands, without expensive changes in their circuitry. Thus the call number transmitters of prior art systems require control times set by the evaluation time associated with received dial tones. Further, in prior art systems, the first pulse series representative of the first digit of the call number is automatically transmitted only when the first dial stage of the associated exchange station is switched to a position wherein it is ready to receive it; otherwise, erroneous dialing could occur.

The time associated with switching the first dial stage of associated exchange system differs, depending upon the type of telephone system employed and the traffic therethrough, and it is therefore not practical to set a uniform predetermined time period before the call number transmitter transmits the first digit. Therefore, it is particularly advantageous to make transmission of the first pulse series dependent upon receipt by the signal receiver of a dial tone, rather than upon the elapsing of a predetermined time period associated with switching the first dial stage to a condition wherein it is ready to receive the first digit. Further, if a busy signal is received by the signal receiver, the call number transmitter should immediately be controlled to interrupt transmission of the call number, in order that the central control systems associated with the exchange and the trunk are not seized for an unnecessary period of time and are therefore freed for seizure by other subscribers. The prior art systems described above do not satisfy these criteria because the time associated with evaluating the repetition rates of signals received by the signal receiver is too long.

SUMMARY OF THE INVENTION

These and other disadvantages and defects of prior art systems are solved by the present invention which eliminates the relatively long time periods associated with evaluating signals received by the signal receiver to control the call number transmitter. A switching circuit is employed in conjunction with the call number transmitter and signal receiver that is connected to the connection lines between selected subscribers to provide criteria indicative of the response of the signal receiver to received signals and the condition of the call number transmitter, to control the initiation as well as the interruption of transmission of the call number by the call number transmitter. The switching state of the signal receiver produced in response to received signals is evaluated, and this permits the utilization of a considerably simpler signal receiver since only the presence of an audible signal, rather than the repetition rate thereof, need be evaluated. Therefore, the evaluation time associated with received signals is considerably decreased relative to prior art systems.

Since the call number transmitter may be in one of several possible switching states, depending upon the state of the connection establishment, and the number of digits transferred from the digit storage means to the connection line in each particular case, a plurality of criteria are available because of the switching states of the signal receiver and the call number transmitter that may be employed to control the call number transmitter and to effect release of the connection system. There thereby results a decrease in the time period associated with transmission of the call number and seizure of the central systems for establishment of the connection. A corresponding decrease in the cost of the telephone system is thereby provided, and unnecessary delays for subscribers associated with the system are eliminated.

DETAILED DESCRIPTION OF THE INVENTION

Figure 1:
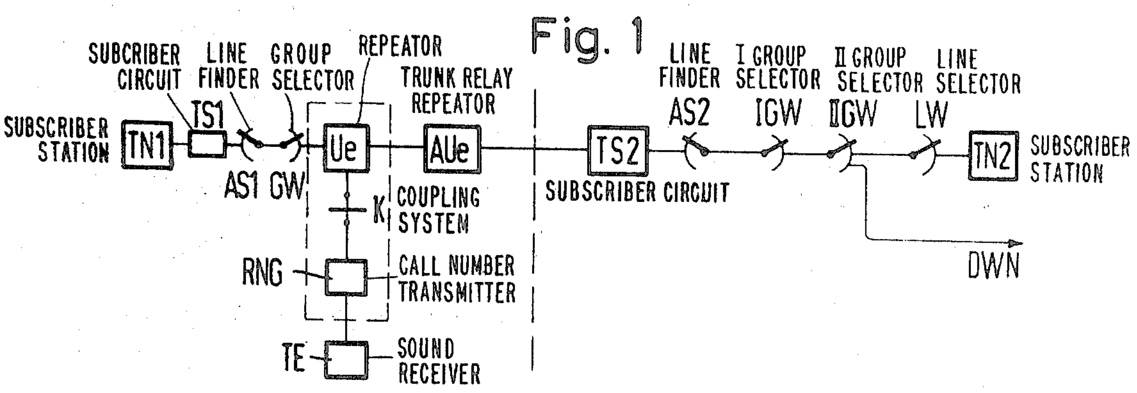
FIG. 1 shows the connection between a subscriber station associated with a subscriber installation having extension stations and a central call number transmitter, and a subscriber station connected to a public telephone system.

FIG. 1 shows the connection between subscriber stations TN1 and TN2. Subscriber station TN1 is associated with a subscriber installation having a plurality of extension stations, and is connected by subscriber circuit TS1, line finder AS1, and group selector stage GW to repeater U*e*. Central call number transmitter RNG is associated with the subscriber installation, and is also connected to repeater U*e*. The output of repeater U*e* is connected to trunk relay repeater AU*e*, that is connected over a trunk line to subscriber circuit TS2 of a public telephone exchange office. Line finder stage AS2, first and second group selector stages IGW and IIGW and line selector LW complete the connection to subscriber TN2. Connection line DWN may be connected between second group selector stage IIGW and another subscriber installation (not shown) having extension stations associated with a subscriber station capable of automatic dialing to establish connections to selected other subscribers, as well as to associated extension stations. The subscriber connection shown is conventional and particulars thereof are therefore not described.

The subscriber installation having subscriber station TN1 with extension stations may therefore be connected by repeater U*e* to coupling system K and thereby to central call number transmitter RNG. Sound receiver T*e* is connected to central call number transmitter RNG for receipt of audible signals indicative of the state of the connection.

Figure 2:
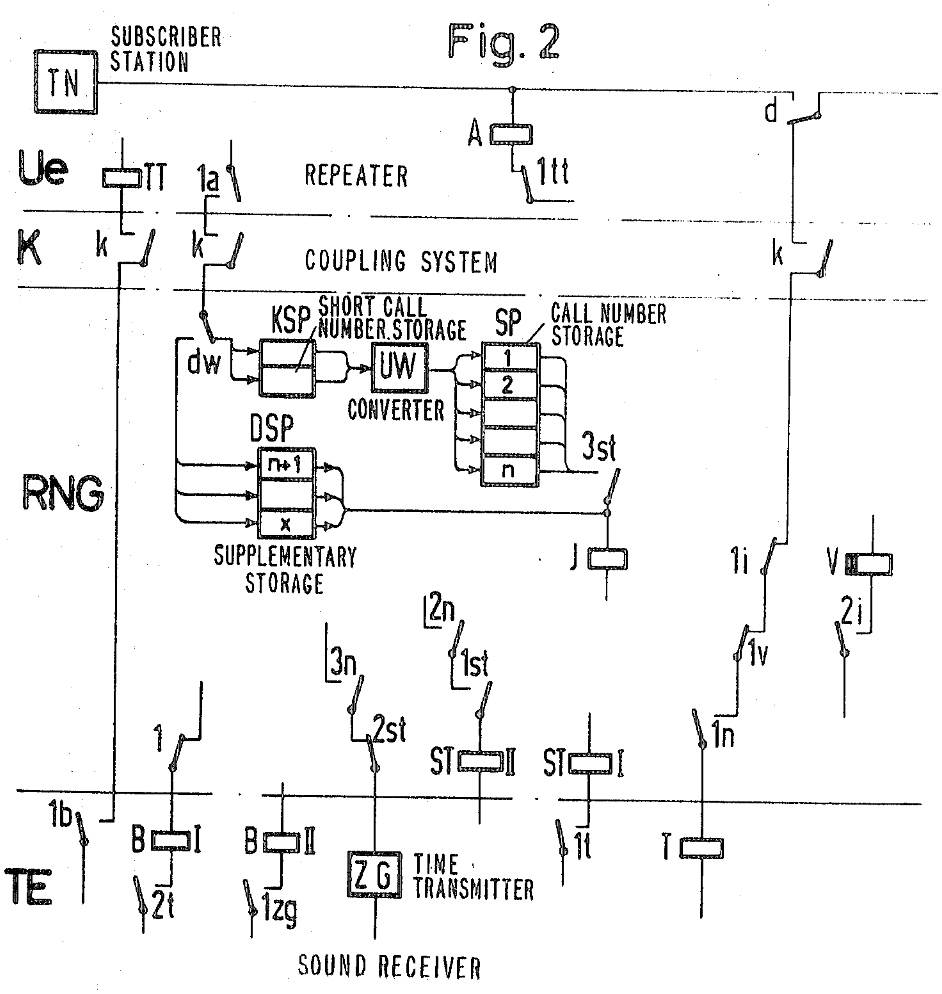
FIG. 2 shows the switching circuit associated with the subscriber installation shown in FIG. 1, according to the invention.

FIG. 2 shows the switching circuit according to the invention of a subscriber installation having extension stations for subscriber station TN1, with respect to repeater *Ue*, coupling system K, central call number transmitter RNG, and sound receiver *Te*. The disclosed switching circuit is described in relation to the establishment of an automatic connection by central call number transmitter RNG.

When subscriber station TN1 seizes repeater *Ue*, relay A of repeater *Ue* is energized through hold contact 1*tt* of relay TT. Additionally, coupling system K functions to actuate contacts K to the closed positions. Thus, subscriber station TN1 seizes short call number storage means KSP, that comprises part of central call transmitter RNG, through contacts 1*a* and *dw*. As known in the prior art, the calling subscriber may dial an identification or short call number that can be converted to the call number of the called subscriber. Thus, subscriber TN1 may dial a short call number into storage means KSP consisting, for example, of two digits. Converter UW is connected to the output thereof and converts the short call number to the corresponding call number of the called subscriber, consisting, for example, of *n* digits, for storage in call number storage means SP. The stored call number may then be transmitted over pulse relay J in the form of successive pulse series, assuming each digit of the call number comprises a predetermined pulse series.

Call number storage means SP thus comprises individual storage sections 1 through *n*, corresponding to the number of individual digits comprising the call number, and the state of each of individual storage sections 1 through *n* determines the derived switching criteria. For example, if digit *n* is stored in individual storage section *n*, contacts 1*n*, 2*n*, and 3*n* will be actuated to the closed positions.

Further, contact *dw* functions to apply additional digits (*n*+1 through *x* to supplementary storage means DSP after the short call number is dialed, if desired. This is accomplished by a switching device (not shown), which actuates contact *dw* to the position wherein it completes the connection to supplementary storage means DSP. The additional digits may then be used to automatically connect the calling subscriber to a called subscriber having extension stations.

Thus, if connection line DWN connects a subscriber installation having a subscriber with extension stations to second line selector stage IIGW, a direct connection thereto can be effected automatically.

When subscriber station TN1 seizes repeater *Ue*, sound receiving relay T is connected to receive audible signals through contacts *d*, *k*, 1*j*, and 1*v* (as shown), when contact 1*n* is closed. When digits 1 through *n* comprising the call number are stored in the corresponding storage sections 1 through *n* of call number storage means SP, contact 1*n* is actuated by storage section *n* to the closed position to complete the electrical connection to sound receiving relay T. Sounding receiving relay T may receive audible signals transmitted over the connection path shown. Upon receipt of an audible signal, sound receiving relay T is energized and actuates contact 1*t* to the closed position to thereby energize start relay ST over winding ST1 thereof. This causes contact 3*st* to be actuated to the closed position, to thereby cause the call number stored in call number storage means SP to be applied to pulse relay J in sequential manner (digits 1 through *n* successively).

Pulse relay J is responsive to the sequence of pulse series stored in call number storage means SP to cause transmission of a corresponding pulse series sequence to the connection path or line. During the time interval that a pulse series is being applied to pulse relay J, contact 1*j* functions to break the electrical connection to sound receiving relay T.

Contact 1*j* is opened and contact 2*j* is closed in response to the leading edges of pulses comprising the pulse series of each digit. When contact 2*j* is closed, it completes the electrical connection to delay relay V and causes energization thereof thereby opening contact 1*v*. Contact 1*j* closes and contact 2*j* opens in response to the trailing edges of the pulses. However, delay relay V functions to maintain contact 1*v* in the open position for a predetermined time period, so that the switching circuit can determine if the pulse comprises the terminal pulse of the pulse series associated with the digit being transmitted, or if it is to be succeeded by additional pulse or pulses comprising the pulse series of the digit being transmitted. If the time interval between successive pulses is greater than said predetermined time period, it is indicative that the pulse comprised the terminal pulse of the digit, and delay relay V then functions to close contact 1*v*, and the electrical connection to signal receiving relay T is again completed. Thus, the time interval between successive pulses of a given pulse series should be less than the time period between successive pulse series. Further, contact 1*j* may be adapted to effect transmission of the digit being applied to pulse relay J to the connection line by conventional means (not shown). Therefore, sound receiving relay T can only be responsive to signals received either prior to transmission of a pulse series, or during the time interval between successively transmitted pulse series (digits). The former signal may be a dial tone indicative that a call connection can be made, and the latter signal may be a busy signal indicative that the call connection cannot be completed.

Thus the first digit (1) stored in storage section 1 is transmitted in the form of a first pulse series, independently of the repetition rate of the received audible signal, and upon completion of transmission of the first pulse series, the electrical circuit of the sound receiving relay T is again completed because contacts 1*v* and 1*j* are then actuated to the closed position. Relay ST is held in the energized state during transmission of the first pulse series to the connection line by hold winding STII, the connection thereto being completed by closed contacts 1*st* and 2*n*, the latter being actuated to the closed position during transmission of the first pulse series to the connection line because digit *n* remains stored in storage section *n*. If the received audible signal was a dial tone, the remaining digits 2 through *n* are then transmitted to the connection line.

However, assuming that an audible signal is applied to sound receiving relay T within the time interval between transmission to the connection line of the first and second pulse series (corresponding to the first and second digits of the call number), it would be indicative of a busy signal. Since the digit stored in storage section 1 (digit 1) has already been transmitted to the connection line, contact 1 is closed. Then, when sound receiving relay T responds to receipt of the busy signal, contact 2*t* is also closed to complete the electrical connection of relay BI. This, in turn, causes actuation of contact 1*b* to the closed position, and completes the electrical connection between subscriber station TN1 and sound receiver *Te*, to cause energization of relay TT and the consequent actuation of its contact 1*tt* to the open position. Thus relay A is deenergized and repeater *Ue* is switched out of connection with subscriber station TN1. Further, the connection between central call number transmitter RNG and repeater *Ue*, as well as the connection path established by transmission of the first digit is also broken. Therefore, repeater *Ue* and central call transmitter RNG are freed for seizure by other subscribers and new dialing operations can be initiated using this equipment.

Thus it is seen that in the above-described switching circuit according to the invention, the first digit of a call number is transmitted after receipt of an audible signal. In prior art telephone systems wherein a busy signal can be produced prior to transmission of the first digit while the preselection stage is seized, utilization of the switching arrangement according to the invention (which does not provide for the evaluation of the repetition rate of received signals) would also cause transmission of the first digit. Then, after transmission of the first digit, the system (that is, prior art telephone systems) would be disconnected since the busy signal would continue.

However, if a connection is established without receipt of a busy signal, sound receiving relay T would not be responsive to received signals during the time intervals between successive dial signals to be transmitted. Notification of the call would be transmitted to the public telephone system through the established connection path after transmission of the last dial signal. Sound receiving relay T then can no longer respond to received signals because the contents of storage section *n* has been transferred, and contact 1*n* is therefore in the open position.

Therefore, the switching circuit provides for the disconnection of the system under these conditions, by employing time transmitter system ZG which responds to relay B to free the seized exchange systems if sound receiving relay T is not energized prior to transmission of the first digit. Thus, time transmitter system ZG is connected in a circuit comprising holding contact 2*st* of start relay ST and contact 3*n*, the latter being actuated to the closed position when the last digit *n* of the call number is stored in storage section *n* of call number storage means SP. Then, if sound receiving relay T is not energized (in response to a received audible signal) start relay ST is not energized, and contact 2*st* remains closed as shown in FIG. 2. After the elapsing of a predetermined time period, time transmitter system ZG is energized, and actuates its contact 1ZG to the closed position to complete the electrical connection for relay winding BII. This causes contact 1*b* to be actuated to the closed position, and to thereby effect release of repeater U*e*, central call number transmitter RNG, sound receiver T*e*, and the connection path, and these are then available for use by other subscribers.

It may be desired to establish a connection between selected subscribers by employing call numbers having less than *n* digits. Therefore, call number storage means SP may be adapted such that the switching circuit is actuated to effect transmission of the call number when the last digit thereof is stored in its corresponding storage section. Thus, an appropriate switching system (not shown) may be employed that is responsive to effect opening of contact 1*n* after the shortest call number desired to be used has been transmitted.

When a connection is established between the calling and called subscribers, conventional means (not shown) are operative to cause contact *d* to complete the connection between the called and calling subscribers so that telephone communication may take place.

It will be evident that many changes could be made in the systems of the invention without departure from the scope thereof. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

We claim:

1. A telephone installation circuit arrangement for processing call connection demands from calling (TN1) subscribers associated with an exchange system having call number transmitters (RNG) to automatically establish connections to called subscribers, and associated signal receivers (TE) to automatically supervise the operating state of connection systems associated with connection lines seized by calling subscribers comprising:

storage means (SP) associated with the call number transmitters (RNG) to store dialed call numbers comprising a plurality of successively dialed digits (1 through *n*);

first switching means (1*n*) actuated in response to storage of a complete dialed call number in the storage means (SP) to connect the associated signal receiver (TE) to the seized connection line during time intervals prior to transmission of the first digit thereto by the call number transmitter, and between transmission of successively dialed digits;

evaluation means (V, ST, ZG) to evaluate the states of the storage means (SP) and the signal receiver upon receipt of signals by the latter to derive control information indicative of the operating state of the connection system associated with the seized connection line; and connection means (T, B) responsive to derived control information to selectively initiate transmission of the call number to the seized connection line or effect release of the exchange system from the calling subscriber.

2. The telephone installation circuit arrangement recited in claim 1 wherein the evaluation means comprises a time transmission system (ZG) responsive if no signal is received by said signal receiver associated therewith prior to transmission of the first digit of the call number to control the connection means to effect release of the exchange system from the calling system.

3. The telephone system circuit arrangement recited in claim 2 further comprising a short number converter to convert dialed short numbers to the desired call number.

4. The telephone system circuit arrangement recited in claim 2 wherein subscribers associated with the exchange have extension stations and a central call number transmitter and signal receiver that may be selectively seized to establish connections to called subscribers.

5. The telephone system circuit arrangement recited in claim 2 wherein receipt of a signal by the signal receiver during the time interval between successive transmission of the first and second digit of call numbers controls the connection means to effect release of the exchange system from the calling subscriber.

6. The telephone installation circuit recited in claim 1 wherein receipt of a dial tone by the signal receiver controls said connection means to initiate transmission of the call number to the seized connection line after the complete dialed call number is stored in the storage means.